Patented Jan. 1, 1935

1,986,345

UNITED STATES PATENT OFFICE 1,986,345

STUFFING FOR CHAIRS AND METHOD OF TREATING SAME

Jacob Kronheim, Cleveland, Ohio

Application October 16, 1933, Serial No. 693,888

1 Claim. (Cl. 92—13)

My invention relates to a stuffing for chairs, cushions, mattresses and the like, and method of treating the same, and has for its general object to provide a sanitary, strong, durable, resilient, fibrous product which can be economically produced, and which will not pack. A further object is to provide a product which will not readily gather or create dust or dirt.

Heretofore, such materials as animal hair, moss, straw and African fibre or sea grass have been commonly used by manufacturers of furniture and kindred articles, for making stuffing, but they lack one or more of the qualities above mentioned. Animal hair is unsanitary, and the strands are not of uniform hardness throughout their length, and consequently have a tendency to pack. Moss is objectionable in that it grinds up quickly in use and gives off considerable dust. African fibre is objectionable because of its strong hay odor, while straw is frequently infested with lice.

According to the present invention, a stuffing free from the objections enumerated herein, is made from strips or strands of certain varieties of plants of the Agave genus or family, which have been treated with a solution of caustic to curl and harden the same.

Figure 1:
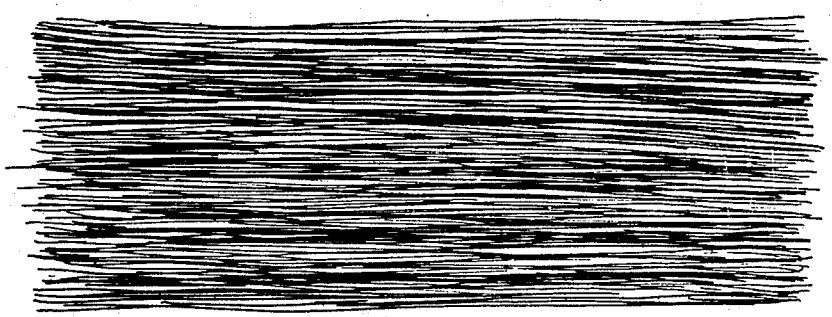
Figure 2:
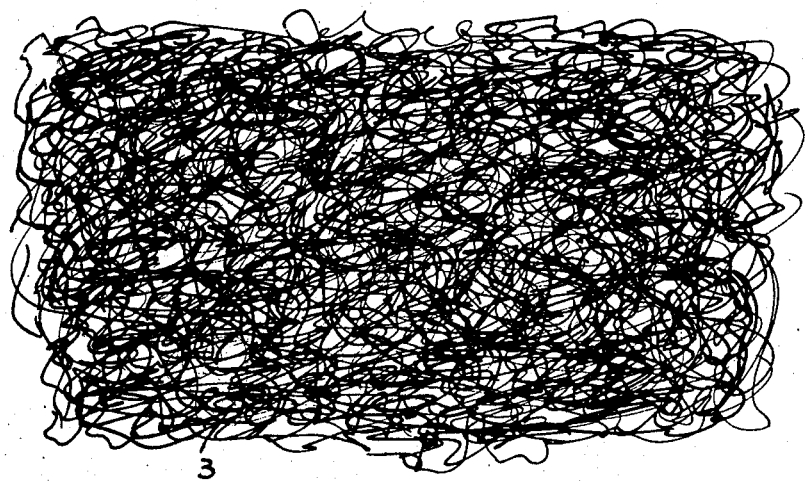

In the accompanying drawing forming part of this specification:

Figure 1 is a perspective view showing a mass of strands of Agave made according to the present invention, but before curling; and Figure 2 is a perspective view of a mass of strands after being curled.

Referring more particularly to the drawing, the individual strips or strands 1 are formed by shredding or otherwise reducing Agave plants to the hair like form indicated in Figure 1. It is essential that the strands then be curled as indicated in Figure 2, in order that the mass 3 will have the desired resiliency. This can be readily effected manually or by machine, in any desired manner, after thoroughly soaking the strands in water but the curling step can be economically and efficiently carried out chemically by merely soaking the strands in a caustic soda solution for a period of about one hour. After this treatment the mass is thoroughly washed in cold clear water and then dried. An excellent curl can be obtained in this way but I have found that while the caustic soda adds materially to the hardness and resiliency of the strands, there is considerable danger of chipping or breaking. Furthermore fibres or strands thus treated are harsh to the touch and do not have the desired resiliency of horse hair.

In order to cure the defects just described and produce a product having the resiliency and feel of horse hair, I spray a small quantity of any suitable highly sulphonated oil upon the mass. While the oil may be applied just before or just after drying it is preferably applied during the drying step, after removal of the mass from the water or caustic bath. The oil imparts a very pleasing luster due to the fact that the surface of the strands absorbs small amounts of the oil. A glossy coating or finish is thus formed which effectively prevents chipping or breaking.

When the strands have been thoroughly dried, the curl will become permanent. After drying the curled and oiled mass is pulled or picked apart manually or by any suitable mechanism, in order to impart the desired fluffiness to the material or mass of material.

In actual practice stuffing consisting of a mass of curled Agave strands 1, formed according to my method has been found free from any of the objections incident to the use of the materials mentioned herein as having been commonly employed, for similar purposes. The strands are of uniform hardness throughout, are strong and resilient, possess no tendency to emit dust and are thoroughly sanitary.

Having thus described my invention, what I claim is:

The herein described method of making stuffing which consists in reducing strands of Agave plants to strands of hair-like consistency, soaking said strands in a caustic soda solution, washing the strands in cold water and then simultaneously drying the strands and spraying the latter with a small quantity of sulphonated oil.

JACOB KRONHEIM.